United States Patent [19]

Osterloh

[11] Patent Number: 4,946,606
[45] Date of Patent: Aug. 7, 1990

[54] PRODUCING OIL-IN-WATER MICROEMULSIONS FROM A MICROEMULSION CONCENTRATE

[75] Inventor: William T. Osterloh, Missouri City, Tex.

[73] Assignee: Texaco Inc., White Plains, N.Y.

[21] Appl. No.: 134,424

[22] Filed: Dec. 17, 1987

[51] Int. Cl.$^5$ .............................................. E21B 43/22
[52] U.S. Cl. .................................. 252/8.554; 166/274; 252/312; 252/314
[58] Field of Search ....................... 166/274; 252/8.554

[56] References Cited

U.S. PATENT DOCUMENTS

| | | | |
|---|---|---|---|
| 4,249,606 | 2/1981 | Kalfoglou | 252/8.554 X |
| 4,252,657 | 2/1981 | Barriol et al. | 252/8.554 |
| 4,271,907 | 6/1981 | Gale | 252/8.554 X |
| 4,488,602 | 12/1984 | Lepper | 252/8.554 |

*Primary Examiner*—Richard D. Lovering
*Assistant Examiner*—Gary L. Geist
*Attorney, Agent, or Firm*—Jack H. Park; Kenneth R. Priem; Harold J. Delhommer

[57] ABSTRACT

The invention is a method of producing a homogeneous oil-in-water microemulsion comprised of oil, brine and surfactant, wherein the oil has a equivalent alkane carbon number higher than the crude oil which is to be recovered by the microemulsion. A mixture of oil, water and surfactant is prepared in the same relative ratios to oil and surfactant as in the microemulsion desired to be injected, but at higher concentration relative to water and salt than in the microemulsion to be injected. The cloudy mixture is stirred while adding salt until the mixture changes to a clear oil-in-water microemulsion concentrate. The microemulsion concentrate is then mixed with sufficient water of the proper salinity to form the oil-in-water microemulsion desired to be injected.

12 Claims, No Drawings

PRODUCING OIL-IN-WATER MICROEMULSIONS FROM A MICROEMULSION CONCENTRATE

BACKGROUND OF THE INVENTION

The present invention concerns a method of producing an oil-in-water microemulsion from a microemulsion concentrate, and a method of employing such a microemulsion to recover hydrocarbons from underground formations.

A microemulsion is a thermodynamically stable, clear or translucent micellar solution comprised of oil, water, and surfactant. The microemulsion may also contain one or more electrolytes, cosurfactants, and when used for enhanced oil recovery, water-soluble polymers and sacrificial agents. The droplet diameters of the dispersed phase range from roughly 140 to 10 nanometers.

Microemulsions may be classified as oil-in-water microemulsions, water-in-oil microemulsions, and middle-phase microemulsions. An oil-in-water microemulsion is a microemulsion in which the external or continuous phase is water and the dispersed phase is oil. A surfactant-water-mixture which forms an oil-in-water microemulsion can equilibrate as a single phase or as two phases such as a lower phase oil-in-water microemulsion plus an equilibrium upper phase of oil, depending on the overall composition of the mixture. Such mixtures are defined by the those skilled in the art of surfactant flooding as existing in a Type II(−) phase environment.

A water-in-oil microemulsion is a microemulsion in which the external or continuous phase is oil and the dispersed phase is water. A surfactant-oil-water mixture which forms a water-in-oil microemulsion can equilibrate as a single phase or as two phases of an upper phase water-in-oil microemulsion plus an equilibrium lower phase of water depending on the overall composition of the mixture. Such mixtures are defined by the those skilled in the art of surfactant flooding as existing in a Type II(+) phase environment.

A middle-phase microemulsion is a microemulsion in which there is apparently no identifiable external or continuous phase. The structure of the middle-phase microemulsion is still unresolved. A surfactant-oil-water mixture which forms a middle phase microemulsion can equilibrate as a single phase, as two phases of a middle-phase microemulsion plus an equilibrium phase of oil or water, or as three phases. The three phases would be a middle-phase microemulsion plus an equilibrium water phase and an equilibrium oil phase. The end result of the equilibrated microemulsion depends on the overall composition of the mixture. Such mixtures are defined by those skilled in the art of surfactant flooding as existing in Type III phase environments or regimes.

A macroemulsion is a thermodynamically unstable, opaque dispersion of two or more usually insoluble liquids, one in the other. It is characterized by its propensity to separate into two or more original liquid phases upon standing. The droplet diameters of the dispersed phase range from roughly 200 nanometers to visually resolvable, discreet aggregates. Because of the propensity of a macroemulsion to separate into its components, macroemulions are not desirable surfactant systems for enhanced oil recovery.

Microemulsions may be used for different chemical purposes. One well known use for oil-in-water microemulsions is to conduct surfactant floods to recover oil from underground formations. It is also believed that oil-in-water microemulsions generally perform better for hydrocarbon recovery when they are formulated with high equivalent alkane carbon number (EACN) oils. Such high EACN oils typically have an EACN 50% to 300% higher than the EACN of the crude oil for which the microemulsion is optimized.

The literature teaches the advantages of using low oil content microemulsions for enhanced oil recovery which are formulated with high EACN oils. U.S. Pat. No. 4,318,816 demonstrates that the stability of a single component surfactant such as an alkylarylpolyalkoxyalkylene sulfonate is enhanced when a high EACN oil is added to an aqueous surfactant to form an oil-in-water microemulsion. The high EACN oil raises the phase inversion temperature of the ethoxylated surfactant. U.S. Pat. No. 4,271,907 teaches that water soluble polymers are compatibly incorporated into an optimized microemulsion only when the microemulsion is formulated with a high EACN oil.

However, oil-in-water microemulsions are difficult to economically produce in the field on a field-wide scale. This difficulty is enhanced when a high EACN oil is used to create the oil-in-water microemulsion.

Since the high equivalent alkane carbon number (EACN) oil is 50% to 300% higher than the crude oil for which the surfactant is optimized, the high EACN oil to brine interfacial tension is high. Because the interfacial tension is high, the high EACN oil is not rapidly microemulsified when added to the surfactant and brine mixture. Instead of forming a microemulsion, a macroemulsion is formed which is useless to an enhanced oil recovery process.

This macroemulsion will eventually be converted to the desired oil-in-water microemulsion if stirred at low shear and ambient temperature for a long period of time, such as several days to several weeks. However, this method is impractical in the field for obvious reasons. It requires a large investment in mixing and storage tanks. The number of tanks needed to hold several days or weeks worth of microemulsion would be prohibitatively large.

One known method of creating a water-in-oil microemulsion with alkoxylated surfactants is to heat and then cool the mixture of surfactant, high EACN oil and brine. When heated, a water-in-oil microemulsion is formed because the alkoxylated surfactants become more hydrophobic as the temperature is increased. Upon cooling, the system is inverted to form a stable, translucent, oil-in-water microemulsion. This method is not practical in the field because large volumes of fluid must be heated to 20° to 50° C. above reservoir temperature.

A second method of producing stable oil-in-water microemulsions is to subject the mixture of surfactant, high EACN oil and brine to a very high shear. For example, a microemulsion having particle sizes less than 100 nm can be formed after multiple passes through a shear device having a presssure drop of about 14,000 psi. Since practical pressure drops obtainable in the field approach only about 2,000 psi, extensive shearing and a large investment in on-site blending and storage facilities would be required to yield injectable oil-in-water microemulsions.

A homogeneous, single-phase oil-in-water microemulsion can also be formed by adding to the water or brine a homogeneous blend of the high EACN oil, and either a "100% active" surfactant or an oil soluble surfactant dissolved in a hydrocarbon. The term "100% active" surfactant refers to a surfactant which contains very little or no water, such as a polyalkoxylated alcohol or an alkylaryl sulfonic acid. These surfactants may contain small amounts of feedstocks and salts, so the surfactant concentration may not actually be 100%. Since the high EACN oil is completely miscible with the 100% active surfactant or the oil soluble surfactant dissolved in hydrocarbon, the high EACN oil is already microemulsified when it is added to the water or brine, and thus the microemulsion forms almost spontaneously.

Although this method is attractive, it can not always be used because many of the surfactants needed for enhanced oil recovery can only be supplied as aqueous concentrates, and not in a 100% active surfactant form. In addition, if the 100% active surfactant or the oil soluble surfactant dissolved in hydrocarbon is but one component of a multi-surfactant blend, it alone may be unable to microemulusify all of the high EACN oil. Most surfactant systems employed in enhanced oil recovery use multiple surfactants.

U. S. Pat. application Ser. No. 944,894, filed Dec. 22, 1986, now abandoned, discloses another way of producing oil-in-water microemulsions. In this method, salt is added to a surfactant, oil and brine mixture in a sufficient quantity to drive the mixture into a Type III or Type II(+) phase regime. Another solution having a selected lower salinity is mixed with the Type III or Type II(+) phase regime to invert the Type III or Type II(+) regime into a Type II(−) oil-in-water microemulsion.

The need for a method to rapidly and economically produce the high EACN oil-in-water microemulsions in the field, on a field-wide scale, is clear. The present invention is a method which provides a significant reduction in on-site construction and operating costs by eliminating the need for heat, extensive shear, and large numbers of storage and blending tanks.

SUMMARY OF THE INVENTION

The invention is a method of producing a homogeneous oil-in-water microemulsion for enhanced oil recovery comprised of oil, brine and surfactant, wherein the oil has a equivalent alkane carbon number higher than the crude oil which is to be recovered by the microemulsion. First, the concentrations of oil, brine and surfactant desired in the microemulsion to be injected into an underground formation are determined. Next, a mixture of oil, water, and surfactant is prepared in which the relative ratios of oil to surfactant are equal to those in the microemulsion desired to be injected, but in which the concentrations of oil and surfactant are higher relative to water and salt than in the microemulsion to be injected. The cloudy mixture is stirred while adding salt until the mixture changes to a clear oil-in-water microemulsion concentrate.

The microemulsion concentrate is then mixed with sufficient water (usually field make-up water) of the proper salinity to form the oil-in-water microemulsion desired to be injected. The quantity and salinity of the added water is selected so that when mixed with the microemulsion concentrate, it will produce a microemulsion having the desired optimal salinity and desired surfactant and oil concentrations.

DETAILED DESCRIPTION

The invention method of producing a homogeneous, single-phase microemulsion from a microemulsion concentrate is ideally suited for field operations in that the method does not require heat or extensive shearing. The requirement for on-site storage tanks and mixing equipment is minimized if the microemulsion concentrate is produced at an existing blending facility and shipped to the field as needed. An important aspect of this invention is that the microemulsion concentrate is single-phase, stable, and pumpable. If the microemulsion concentrate did not possess these characteristics, it would not be amenable to shipping, and would require extensive on-site storage and mixing facilities. These savings in energy, construction, and operation yield production costs that are substantially lower than other field methods which can be used to produce such microemulsions. In addition, the method is fast and does not adversely affect the performance of the microemulsion.

In implementing this method, the injection microemulsion is first optimized for the particular reservoir using techniques well known to those skilled in the art of surfactant and polymer enhanced oil recovery. These methods include, but are not limited to, phase behavior, interfacial tension determinations, and oil recovery experiments. As part of the optimization, the type and quantity of high EACN oil needed to prepare the microemulsion is determined as taught in the literature. It is taught that the concentrations of the high EACN oil in the microemulsion must be below the microemulsification limit to insure that only one, and not two or more phases exist. If too much oil is added, a separate excess oil phase will form. During this optimization, the potential microemulsions can be prepared in the laboratory using the heating and shearing methods discussed above.

The active surfactant concentration in the bulk surfactant is not critical, but certain practical guidelines are suggested. If the active surfactant content is low (about 10% or less, the balance being mainly water), a large amount of salt will be needed to form the microemulsion concentrate. At a very low active surfactant content, the amount of salt required may approach the amount that is present in the microemulsion desired to be injected. In contrast, if the active surfactant content is high (about 70% or more, the balance being water), very little salt will be required to form the microemulsion concentrate, but the viscosity of the concentrate may be so high that the concentrate cannot be easily handled or pumped. Based on economics and ease of handling, the active surfactant concentration in the bulk surfactant is preferably between 10 wt % and 70 wt %.

Cosurfactants such as alcohols, solubilizers, viscosity enhancing polymers such as polyacrylamides and polysaccharides, and sacrificial agents such as lignosulfonates or polyethylene glycols can also be used in the method of this invention. They may be added to the microemulsion to be injected, the microemulsion concentrate, or the mixture used to form the concentrate. Preferably, these compounds are added to the mixture used to form the concentrate and are present in the microemulsion concentrate. This greatly simplifies field blending of the final microemulsion. However, care must be taken with the addition of viscosity enhancing polymers in order to have a flowable concentrate.

Once the composition of the microemulsion to be injected is defined via the optimization procedures, the minimum amount of salt required to produce the microemulsion concentrate is determined by a very simple experiment. A blend of the bulk surfactant, additives and high EACN oil, at relative ratios equal to those in the injection microemulsion, is stirred while salt is added, preferably in small increments. If the mixture remains an opaque macroemulsion after the added salt has dissolved, another increment of salt is added. This procedure is repeated until the solution becomes translucent or clear, which indicates that the microemulsion concentrate has been successfully produced. Although more than the minimum necessary amount of salt may be added to the microemulsion concentrate, this is usually disadvantageous as it increases the amount of fresh water that must be added to the concentrate to produce the injected microemulsion.

The minimum amount of salt which must be added to make the microemulsion concentrate depends on several factors, including the salinity of the microemulsion to be injected, the EACN of the oil used to prepare the microemulsion and the concentration of active surfactant in the bulk surfactant, i.e., the amount of water present. The minimum amount of salt required to make the microemulsion concentrate increases as (1) the salinity of the microemulsion to be injected increases, (2) the EACN of the oil increases, and (3) the concentration of active surfactant in the bulk surfactant decreases, i.e., the amount of water increases.

This method of forming the microemulsion concentrate is flexible in that some salt in excess of the minimum amount can be added without adversely affecting the properties of the microemulsion concentrate. The salt concentration range over which the microemulsion concentrate is formed will differ for every system because a microemulsion concentrate can be comprised of different surfactants and oils at various concentrations.

However, it is critical to refrain from adding too much salt because the phase environment of the mixture may shift into the Type III or Type II(+) regime. If this occurs, there is a high probability that the mixture will equilibrate as two or possibly three phases. The microemulsion desired to be injected could still be prepared from such a multi-phase mixture, but this situation is not desired because the multi-phase mixture is not amenable to shipping, storage, or accurate and reproducible mixing with field dilution brine.

Any type of salt can be used to prepare the microemulsion concentrate, such as the chlorides of sodium, potassium, lithium, calcium, magnesium, strontium, and barium. Ideally, the composition of the added salt should be similar, in terms of the identity and ratio of monovalent to divalent cations, to that of the salt contained in the microemulsion desired to be injected because the salt composition can effect the phase behavior of the microemulsion. But a benefit of this invention method is that the salt composition does not have to be identical to that of the original injection microemulsion brine, especially if the added salt is a monovalent chloride, such as NaCl.

When the method is used as taught in this invention, very little NaCl is required to prepare the microemulsion concentrate. Furthermore, equal phase behavior and oil recovery performance is exhibited by microemulsions prepared by the invention and by the traditional heating and shearing process. Usually, the quantity of NaCl in the microemulsion concentrate is only 5-15% of the total salts present in the microemulsion desired to be injected. Thus, the ratio of monovalent to divalent cations present in the microemulsion prepared from concentrate will be only slightly different from that in a microemulsion prepared by heating and shearing.

The salt used to produce the microemulsion concentrate may be in the form of a solid, or it may be dissolved in water, preferably saturated in water. The use of solid salt has presented no difficulties, and is most preferred. The solid is preferred because it is "100% active," whereas most saturated salt solutions contain more water than salt. To reach the required salinity in the microemulsion concentrate, more salt will be needed if it is added as a saturated aqueous solution than as a solid. The final volume of the microemulsion concentrate will also be greater if a saturated salt solution is used. Thus, the use of solid salt is preferred because less salt is required and concentrate volume is smaller, which lead to lower chemical and shipping costs.

Since the composition of the microemulsion concentrate is known, the particular quantity and salinity of field dilution brine needed to produce the injection microemulsion can be easily calculated. The salinity of the field dilution brine is necessarily lower than the brine used to prepare the injection microemulsion by heat and shear because the microemulsion concentrate contains some salt. The salinity of the field dilution brine is most often equal to 85%–95% of the original field brine, which is the brine used with the heat and shear method. Thus, there is no need for a large amount of fresh water in the field.

As a first, but often adequate approximation, the salinity of the field dilution brine can be calculated on a weight basis, especially if NaCl was used to prepare the microemulsion concentrate. If the microemulsions prepared from the concentrate and by heating and shearing do not exhibit similar phase behavior and oil recovery efficiency when the salinity of the dilution brine is calculated in this manner, then the salinity of the field dilution brine should be calculated on a molar or ionic strength basis. If the two microemulsions still do not exhibit similar performance, then the salinity of the field dilution brine must be determined experimentally by varying the salinity of the dilution brine until similar phase behavior and oil recovery efficiency are exhibited.

The oil incorporated into the microemulsion should have an EACN higher than the crude oil for which the surfactant system is optimized. Preferably, the incorporated microemulsion oil should have an EACN about 50% to about 300% higher than the EACN of the crude oil to be recovered.

High EACN oils may have pour points higher than the ambient temperatures used in the preparation of microemulsions. In such a case, some heating may be required in the first step of the process to create the oil, surfactant and brine mixture. Although this increases the cost of the method, only a fraction of the overall injected microemulsion must be heated.

This invention process can be used with both high salinity and low salinity microemulsions, and with both single component and multiple component surfactant systems. The method is applicable to anionic, cationic, nonionic surfactants, and mixtures thereof.

Oil-in-water microemulsions can be very efficient at recovering crude oil from underground hydrocarbon formations when used in a surfactant flood. Typically, the microemulsion is injected into the formation through one or more injection wells and pushed towards one or more production wells by a drive fluid injected after the microemulsion. Different drive fluids are well known in the art. Possible drive fluids include water, gas, water with a viscosifying polymer, and others well known to those skilled in the art. Crude oil and other fluids are recovered from one or more production wells.

The following examples further illustrate the novel method of producing a single-phase, homogeneous, oil-in-water injection microemulsion from a microemulsion concentrate. These examples are given by way of illustration and not as limitations on the scope of the invention. Thus, it should be understood that the steps and materials employed in the instant method may be varied to achieve similar results within the scope of the invention.

EXAMPLE 1

An oil-in-water microemulsion was optimized at 47° C. for a reservoir crude oil and a field brine which had a salinity of 160 g/kg TDS (16.0 wt % total dissolved salts) and a monovalent/divalent cation ratio of 22. The crude had an EACN of about 8. This optimized microemulsion was prepared by heating and shearing. The heat and shear microemulsion (hereafter "MHS #1") was comprised of:
2.38 wt % bulk Enordet LXS-1314 (19.5 wt % active, in water),
3.70 wt % bulk LN-80COS (28.0 wt % active, in water),
1.50 wt % Carbowax PEG-1000 (sacrificial agent),
0.80 wt % Semtol 350 white oil, and
91.62 wt % 160 g/kg TDS field make-up brine.

Enordet LXS-1314 is a trademarked sodium alkyl ortho-xylene sulfonate sold by Shell Chemical Company. LN-80COS is a sodium dodecyl/tetradecyl polyethoxysulfate, manufactured by Texaco Chemical Company. Carbowax PEG-1000 is a trademarked polyethylene glycol with an average molecular weight of 1000 sold by Union Carbide Corporation. Semtol 350 is a trademarked white oil having an EACN of about 22 sold by the Sonneborn Division of Witco Corporation.

To prepare the microemulsion concentrate (hereafter "MEC #1", "MEC #2", "MEC #3", "MEC #4", "MEC #5", or "MEC #6", according to the example number) using a minimum amount of NaCl, 11.92 grams of 19.5% active Enordet LXS-1314, 18.48 grams of 28% active LN-80COS, 7.50 grams Carbowax PEG-1000, and 4.00 grams of Semtol 350 oil were combined in a jar equipped with a stirring bar. The total quantity of these chemicals was chosen arbitrarily, but it was critical that the relative ratios of the chemicals be similar to those ratios in the MHS #1.

While stirring the macroemulsion which was formed, small increments of 0.1–0.2 grams solid NaCl were added. When the solution remained cloudy or opaque after the NaCl had dissolved, the solution was still a macroemulsion and not yet a microemulsion. The incremental addition of NaCl was continued until 3.75 grams had been added. At this point the solution became clear, single-phase, and stable, indicating that the solution was now in the form of an oil-in-water microemulsion. The MEC #1 had a viscosity of 131 centipoise at 25° C. and a shear rate of 3.67 sec$^{-1}$. The MEC #1 was composed of:
26.11 wt % bulk Enordet LXS-1314 (19.5 wt % active, in water),
40.48 wt % bulk LN-80COS (28.0 wt % active, in water),
16.43 wt % Carbowax PEG-1000 (sacrificial agent),
8.76 wt % Semtol 350 white oil, and
8.21 wt % NaCl.

The fact that the MEC #1 was an oil-in-water microemulsion was determined by equilibrating it with an equal volume of Semtol 350 white oil at ambient temperature. The equilibrated mixture exhibited Type II(−) phase behavior. It equilibrated as a lower phase oil-in-water microemulsion that was in equilibrium with excess Semtol 350. If the MEC #1 was either a middle phase microemulsion or water-in-oil microemulsion, the equilibrated mixture would have exhibited Type III or Type II(+) phase behavior.

To prepare 100 grams of injection microemulsion from microemulsion concentrate (hereafter "MMEC #1", "MMEC #2", "MMEC #3", "MMEC #4", "MMEC #5", or "MMEC #6", according to the example number), 9.13 grams of MEC #1 was added to 90.87 grams of field dilution brine which had a salinity of 153.1 g/kg TDS. In this case, the required salinity of the field dilution brine was calculated so that the MHS #1 and the MMEC #1 contained equal weight fractions of salts. Since the salinity of the field dilution brine is 95.7% that of the original MHS #1 make-up brine (160 g/kg TDS), very little fresh water would be needed in the field to reduce the salinity from 160 to 153.1 g/kg TDS. This is important because the availability of fresh water is frequently limited in the field.

The MEC #1 was completely miscible with the field dilution brine. The MMEC #1 formed almost spontaneously when the MEC #1 and brine were mixed. Such a situation is ideal because a simple in-line mixer can be used in the field to mix the MEC with the field dilution brine.

The MHS #1 and the MMEC #1 exhibited practically identical phase behavior with the reservoir crude oil and performed equally well in oil recovery experiments. These results indicate that the salinity of the field dilution brine can be calculated on a weight basis when the microemulsion concentrate is prepared with a monovalent cation salt.

EXAMPLES 2-3

To determine what effect excess salt had on the properties of the microemulsion concentrate, the preparation of MEC #1 was repeated as described in Example 1, except 5.00 grams of NaCl (MEC #2) and 6.00 grams of NaCl (MEC #3) were added instead of 3.75 grams of NaCl. The MEC #2 was comprised of:
25.42 wt % bulk Enordet LXS-1314 (19.5 wt % active, in water),
39.40 wt % bulk LN-80COS (28.0 wt % active, in water),
15.99 wt % Carbowax PEG-1000 (sacrificial agent),
8.53 wt % Semtol 350 white oil, and
10.66 wt % NaCl.

The MEC #3 was comprised of:
24.89 wt % bulk Enordet LXS-1314 (19.5 wt % active, in water),
38.58 wt % bulk LN-80COS (28.0 wt % active, in water),
15.66 wt % Carbowax PEG-1000 (sacrificial agent),
8.34 wt % Semtol 350 white oil, and
12.53 wt % NaCl.

The MEC #2 was clear, single-phase, and stable. It had a viscosity of 217 centipoise at 25° C. and a shear rate of 1.83 sec$^{-1}$. As in Example #1, the MEC #2 was shown to be an oil-in-water microemulsion by exhibiting Type II(−) phase behavior with added Semtol 350 oil at ambient temperature.

To prepare 100 grams of MMEC #2 from MEC #2, 9.38 grams of MEC #2 was added to 90.62 grams of field dilution brine which had a salinity of 150.7 g/kg TDS. In this case, the required salinity of the field dilution brine was calculated so that the MHS #1 and the MMEC #2 contained equal weight fractions of salts. The MHS #1 and the MMEC #2 exhibited practically identical phase behavior with the reservoir crude oil and performed equally well in oil recovery experiments. This is further proof that the salinity of the field dilution brine can be calculated on a weight basis when the MEC is prepared with a monovalent cation salt.

The MEC #3 was opaque, and not clear and stable. Upon standing, the mixture separated into a small microemulsion phase above an aqueous phase The microemulsion phase was identified as a middle-phase microemulsion by phase behavior. When additional Semtol 350 oil was added, the mixture equilibrated as a middle-phase microemulsion plus a brine phase and an oil phase. A microemulsion was not prepared from MEC #3.

These results indicate that the method is flexible in that salt can be added in excess of the minimum amount without adversely affecting the microemulsion concentrate. However, if too much salt is added, the desired stable, single-phase oil-in-water microemulsion is not formed.

EXAMPLES 4-5

To determine the effect of lower concentration bulk surfactants on the minimum salt requirement, the preparation of MEC #1 was repeated as described in Example 1, except that the bulk LN-80COS contained either 20.0% active surfactant (MEC #4) or 15% active surfactant (MEC #5). To keep the weight ratios of active LXS-1314 and LN-80COS in the MEC #4 and #5 equal to that in the MHS #1, 25.87 grams and 34.47 grams of bulk LN-80COS were used to prepare MEC #4 and MEC #5, respectively.

The minimum amounts of NaCl required to form MEC #4 and #5 were 5.10 grams and 6.50 grams, respectively. The MEC #4 was comprised of:
21.92 wt % bulk Enordet LXS-1314 (19.5 wt % active, in water),
47.56 wt % bulk LN-80COS (20.0 wt % active, in water),
13.79 wt % Carbowax PEG-1000 (sacrificial agent),
7.35 wt % Semtol 350 white oil, and
9.38 wt % NaCl.
The MEC #5 was comprised of:
18.51 wt % bulk Enordet LXS-1314 (19.5 wt % active, in water),
53.53 wt % bulk LN-80COS (15.0 wt % active, in water),
11.65 wt % Carbowax PEG-1000 (sacrificial agent),
6.21 wt % Semtol 350 white oil, and
10.10 wt % NaCl.

Both MEC #4 and #5 were clear, single-phase, and stable. The viscosities of MEC #4 and #5 were 78 and 73 centipoise (25° C., 7.34 sec$^{-1}$), respectively. These results indicate that as the bulk surfactant contains less active surfactant and more water, the minimum amount of salt required to form the MEC increases, but not to an impractical level.

To prepare 100 grams of MMEC #4 from MEC #4, 9.25 grams of MEC #4 was added to 90.75 grams of field dilution brine which had a salinity of 152.0 g/kg TDS. To prepare 100 grams of MMEC #5 from MEC #5, 9.32 grams of MEC #5 was added to 90.68 grams of field dilution brine which had a salinity of 151.3 g/kg TDS. In both cases, the required salinity of the field dilution brine was calculated so that the MHS #1 and the MMEC #4 and #5 contained equal weight fractions of salts. The MHS #1 and the MMEC #4 and #5 exhibited practically identical phase behavior with the reservoir crude oil and performed equally well in oil recovery experiments.

EXAMPLE 6

To determine the effect of a lower EACN oil on the minimum salt requirement, the preparation of MEC #1 was repeated as described in Example 1, except n-dodecane (EACN=12) was used in place of Semtol 350.

To produce the MEC #6, a minimum of 1.30 grams of NaCl was needed, as compared to 3.75 grams when the oil was Semtol 350. The MEC #6 was stable, clear, single-phase and had a viscosity of 68 centipoise at 25° C. and a shear rate of 7.34 sec$^{-1}$. As discussed in Example 1, the phase behavior analysis confirmed that the MEC #6 was an oil-in-water microemulsion. The MEC #1 was comprised of:
27.59 wt % bulk Enordet LXS-1314 (19.5 wt % active, in water),
42.78 wt % bulk LN-80COS (28.0 wt % active, in water),
17.36 wt % Carbowax PEG-1000,
9.26 wt % n-dodecane,
3.01 wt % NaCl.

To prepare 100 grams of MMEC #6 from MEC #6, 8.64 grams of MEC #6 was added to 91.36 grams of field dilution brine which had a salinity of 157.6 g/kg TDS. In this case, the required salinity of the field dilution brine was calculated so that the MHS #1 and the MMEC #6 contained equal weight fractions of salts. The MHS #1 and the MMEC #6 exhibited practically identical phase behavior with the reservoir crude oil and performed equally well in oil recovery experiments.

These results indicate that as the EACN of the oil is lowered, the minimum amount of salt required to form the microemulsion concentrate decreases. The results also show that the method of this invention in applicable with a wide range of EACN oils.

Many other variations and modifications may be made in the concepts described above by those skilled in the art without departing from the concepts of the present invention. According, it should be clearly understood that the concepts disclosed in the description are illustrative only, and are not intended as limitations on the scope of the invention.

What is claimed:
1. A method of producing a homogeneous oil-in-water microemulsion comprised of oil, brine and surfactant for recovering crude oil and hydrocarbons from underground hydrocarbon formations, which comprises:
   determining the concentrations of oil, brine and surfactant desired in the oil-in-water microemulsion to be injected into the formation,
   said oil having an equivalent alkane carbon number higher than the crude oil which is to be recovered by the microemulsion;

preparing a mixture of oil, water and surfactant having the same relative ratios of oil to surfactant as in the microemulsion desired to be injected, but having higher surfactant and oil concentrations relative to water and salt than in the microemulsion desired to be injected;

stirring the mixture while adding salt until the mixture changes from cloudy to clear and becomes an oil-in-water microemulsion concentrate;

mixing sufficient water of the proper salinity with the microemulsion concentrate to form the oil-in-water microemulsion desired to be injected.

2. The method of claim 1, wherein the oil has an equivalent alkane carbon number about 50% to about 300% higher than the equivalent alkane carbon number of the crude oil.

3. The method of claim 1, wherein the microemulsion concentrate contains a single surfactant.

4. The method of claim 1, wherein the microemulsion concentrate contains multiple surfactants.

5. The method of claim 1, wherein the microemulsion concentrate contains a solubilizer.

6. The method of claim 1, wherein the microemulsion concentrate contains a sacrificial agent.

7. The method of claim 1, further comprising adding water soluble polymers to the microemulsion desired to be injected to increase the viscosity of the microemulsion.

8. The method of claim 1, wherein the surfactant is anionic, cationic, or nonionic.

9. The method of claim 1, wherein the salt added to the mixture to produce the microemulsion concentrate is sodium chloride, potassium chloride, or lithium chloride.

10. The method of claim 1, wherein the salt added to the mixture furnishes divalent cations of calcium, magnesium, strontium, or barium.

11. A method of producing a homogeneous oil-in-water microemulsion comprised of oil, brine, multiple surfactants and a sacrificial agent for recovering crude oil and hydrocarbons from underground hydrocarbon formations, which comprises:

determining the concentrations of oil, brine, multiple surfactants and sacrificial agent desired in the oil-in-water microemulsion to be injected into the formation, said oil having an equivalent alkane carbon number about 50% to about 300% higher than the equivalent alkane carbon number of the crude oil which is to be recovered by the microemulsion;

preparing a mixture of oil, water, surfactants and sacrificial agent having the same relative ratios of oil to multiple surfactants and sacrificial agent as in the microemulsion desired to be injected, but having higher oil, surfactant and sacrificial agent concentrations relative to water and salt than in the microemulsion desired to be injected;

stirring the mixture while adding sodium chloride until the mixture changes from cloudy to clear and becomes an oil-in-water microemulsion concentrate;

mixing sufficient water of the proper salinity with the microemulsion concentrate to form the oil-in-water microemulsion desired to be injected.

12. A method of recovering oil and hydrocarbons with a microemulsion from an underground hydrocarbon formation penetrated by at least one injection well and at least one production well, which comprises:

injecting into an hydrocarbon formation through an injection well a homogeneous oil-in-water microemulsion comprised of oil, brine and surfactant, said microemulsion produced by mixing a microemulsion concentrate with sufficient water of the proper salinity to form an oil-in-water microemulsion, said microemulsion concentrate produced by determining the concentrations of oil, brine and surfactant desired in the oil-in-water microemulsion to be injected into the formation, said oil having an equivalent alkane carbon number higher than the crude oil which is to be recovered by the microemulsion, preparing a mixture of oil, water and surfactant having the same relative ratios of oil to surfactant as in the microemulsion desired to be injected, but having higher oil and surfactant concentrations relative to water and salt in the microemulsion desired to be injected, and stirring the mixture while adding salt until the mixture changes from cloudy to clear and becomes an oil-in-water microemulsion concentrate;

injecting a drive fluid into the formation through the injection well to push the microemulsion towards a production well; and recovering oil, hydrocarbon and other fluids from the production well.

* * * * *